United States Patent
Kornienko et al.

(10) Patent No.: US 9,926,228 B2
(45) Date of Patent: Mar. 27, 2018

(54) METHOD OF PRODUCING GYPSUM BINDER

(71) Applicant: Igor Anatolievich Stavrulov, Moscow (RU)

(72) Inventors: Igor Ivanovich Kornienko, Aleksandrovka (UA); Igor Anatolievich Stavrulov, Moscow (RU)

(73) Assignee: Igor Anatolievich Stavrulov, Moscow (RU)

( * ) Notice: Subject to any disclaimer, the term of this patent is extended or adjusted under 35 U.S.C. 154(b) by 0 days.

(21) Appl. No.: 15/518,893

(22) PCT Filed: Oct. 13, 2014

(86) PCT No.: PCT/RU2014/000766
§ 371 (c)(1),
(2) Date: Apr. 13, 2017

(87) PCT Pub. No.: WO2016/060580
PCT Pub. Date: Apr. 21, 2016

(65) Prior Publication Data
US 2017/0253525 A1    Sep. 7, 2017

(51) Int. Cl.
*C04B 11/02*    (2006.01)

(52) U.S. Cl.
CPC .................... *C04B 11/02* (2013.01)

(58) Field of Classification Search
CPC .................................................. C04B 11/02
See application file for complete search history.

(56) References Cited

U.S. PATENT DOCUMENTS

| | | | | |
|---|---|---|---|---|
| 1,901,051 A | * | 3/1933 | Randel | C04B 11/02 106/757 |
| 2,616,789 A | * | 11/1952 | Hoggatt | C04B 11/024 423/159 |
| 4,309,391 A | * | 1/1982 | O'Neill | C04B 11/032 106/740 |
| 6,964,704 B2 | * | 11/2005 | Cox | C04B 11/02 106/772 |
| 7,335,254 B2 | * | 2/2008 | Bruce | C04B 11/02 106/772 |
| 7,695,561 B2 | * | 4/2010 | Cox | C04B 11/02 106/772 |

FOREIGN PATENT DOCUMENTS

SU    1784602 A1 * 12/1992

* cited by examiner

*Primary Examiner* — Anthony J Green
(74) *Attorney, Agent, or Firm* — Bardmesser Law Group

(57) ABSTRACT

A method of producing a gypsum binder, the method including dehydrating of gypsum raw material lumps by heating in a gaseous medium with further drying, cooling, and milling stages, wherein the heating gypsum raw material lumps is performed either by: (i) placing the lumps in a heating medium set to a temperature exceeding the temperature under which dehydration and formation of gypsum α-hemihydrate occurs; and/or (ii) placing the lumps in a heating medium having a high rate of temperature increase such that a temperature higher than the temperature under which dehydration and formation of gypsum α-hemihydrate occurs is reached; wherein a heating time is selected sufficient for completion of the process of gypsum α-modification formation within the gypsum lumps, and wherein the heating is performed under atmospheric pressure through lump surface.

20 Claims, No Drawings

METHOD OF PRODUCING GYPSUM BINDER

CROSS-REFERENCE TO RELATED APPLICATIONS

This application is a US National Phase of PCT/RU2014/000766, International Filing Date Oct. 13, 2014.

BACKGROUND OF THE INVENTION

Field of the Invention

The invention relates to the construction material industry and can be used for producing gypsum binders and products made on their basis.

Description of the Related Art

The principle of obtaining gypsum binders is based on a capacity of calcium sulfate dihydrate, when heated, to undergo dehydration accompanied by changes in the crystal lattice structure (re-crystallization).

Natural gypsum stone, recycled gypsum and synthetic gypsum, which is a co-product of the chemical, power, food, wood-chemical and other industries (phosphogypsum, borogypsum, chlorogypsum, cytrogypsum, etc.), are used as raw materials for production of gypsum binders.

The industry of low-baked gypsum binders, using a treatment temperature up to 900° C., produces several types of products: $\alpha$- and $\beta$-modifications of calcium sulfate hemihydrate, dehydrated hemihydrate, soluble and insoluble anhydrite. Dehydrated hemihydrate and soluble anhydrite are unstable in the air and develop into hemihydrate. The majority of the production volume falls into $\alpha$- and $\beta$-hemihydrates ($\alpha$- and $\beta$-gypsum) or their mixtures. There is a market segment of insoluble anhydrites, though it is quite small.

Obtained by baking, $\alpha$- and $\beta$-modifications of gypsum are characterized by the same crystal lattice type. Their difference is that the first has a better structure with well-defined large-size crystals, while the second consists of smallest aggregates of defective crystals with a developed inner surface. As a result, $\alpha$-gypsum products show much better characteristics of strength and moisture resistance than $\beta$-gypsum products. However, the primary production volume of gypsum binders falls into $\beta$-hemihydrate, owing to its simpler and cheaper production technology.

The process for producing $\alpha$-modification of gypsum can be subdivided into three key groups:

Heat treatment of lumpy gypsum raw material with saturated steam under pressure using various methods of drying the dehydrated product and subsequent milling;

Heat treatment of powdered gypsum raw material in aqueous suspension under pressure, with mechanical dehydration, drying, and milling;

Heat treatment of powdered gypsum raw materials at atmospheric pressure in salt solutions, followed by washing, dehydration, drying, and milling.

The main disadvantage of the first two processes is that the processes require high pressurization and it is, normally, implemented only periodically. This significantly increases the cost of both the plant for their implementation and the resulting product.

The last two processes relate to processing in a liquid medium and use additional steps of washing and drying. This consumes a large amount of water and additional heat. This is a significant disadvantage of these methods. Therefore of great practical importance are methods of processing in a gaseous medium, eliminating the need for washing and further drying.

At temperatures 105-135° C., these processes provide, mostly, $\alpha$-hemihydrate; at 200-210° C.—$\alpha$-dehydrated hemihydrate; at 220-250° C.—$\alpha$-soluble anhydrite. Higher temperatures produce insoluble anhydrite.

Construction gypsum ($\beta$-gypsum) is obtained using a simple technology by heat treatment of gypsum raw material at normal pressure within the temperature range 100° C.-160° C.

The processes can be subdivided into three key groups:

Baking lumpy raw material in drying drums or rotary kilns using flue gases at a relatively low rate of raw material dehydration and, as a consequence, with baking duration of several hours and flue gas components getting into the product;

Baking of pre-milled raw material in kettles with non-contact heating through the wall of a heating unit and baking duration not exceeding 2 hours;

Baking of milled raw material, contacting with heat medium, in a suspension (in mills, "fluidized bed" machines, etc.) at a high rate of the dehydration processes—up to 1 hour.

The advantage of the processes for producing $\beta$-modification of gypsum is the technological simplicity that does not require high pressurization and low cost. Nevertheless, $\beta$-modification of gypsum, obtained using these methods, is characterized by poor strength properties, no moisture resistance and short mixing time.

In order to improve gypsum binder properties, depending on required characteristics, multi-phase (i.e., from diverse modifications of gypsum) and/or composite (with adding external non-gypsum components) gypsum-based mixtures are produced. Their production involves varying the composition, granulometry, and the component ratio for regulating functional properties: durability, setting time, water resistance, etc. There are great many various additives affecting properties of gypsum binders. All this greatly increases the cost of the finished product.

Known is a method of making the gypsum binder described in RU patent No. 2023699 published on Nov. 30, 1994, which suggests a method of producing a binder with predominating calcium sulfate $\alpha$-hemihydrate. The method consists of gypsum dehydration carried out in lumps at atmospheric pressure, in a gaseous medium its important advantage is in use of an electromagnetic super-high-frequency field (SHF field). Due to volumetric heating affected by SHF radiation, dehydration with development of predominantly $\alpha$-modification of gypsum occurs in the proper volume of a lump, which becomes a sort of "mini autoclave" for itself. $\beta$-modification of gypsum develops in the near-surface layer.

The disadvantage of this technical solution is applying, during its implementation, a very uneconomic method of heating with SHF radiation generated due to using electric power and, consequently, its high cost.

SUMMARY OF THE INVENTION

The present invention is related to a method for producing gypsum binders and products made on their basis that substantially obviates one or more of the disadvantages of the related art.

In one aspect of the invention, there is provided a method of producing a gypsum binder, the method including dehydrating of gypsum raw material lumps by heating in a gaseous medium with further drying, cooling, and milling stages, wherein the heating gypsum raw material lumps is performed either by: (i) placing the lumps in a heating medium set to a temperature exceeding the temperature under which dehydration and formation of gypsum α-hemihydrate occurs; or (ii) placing the lumps in a heating medium having a high rate of temperature increase such that a temperature higher than the temperature under which dehydration and formation of gypsum α-hemihydrate occurs is reached; wherein a heating time is selected sufficient for completion of the process of gypsum α-modification formation within the gypsum lumps, and wherein the heating is performed under atmospheric pressure through lump surface.

Optionally, natural gypsum stone and/or synthetic gypsum, and/or recycled gypsum are used as gypsum raw materials. Optionally, lumps of gypsum raw material are formed by crushing and/or agglomerating. Optionally, the heating medium temperature and heating time are determined experimentally for a particular raw material, depending on the size of lumps, properties of gypsum raw material and pore structure of the end product. Optionally, the heating medium temperature is 140° C. to 600° C.

Optionally, the temperature of the medium for the drying stage is 100° C. to 400° C. Optionally, the heating and drying stages are combined. Optionally, the drying and/or cooling and/or milling stages are combined. Optionally, the heating time is selected from 20 minutes to 5 hours depending on a size of the gypsum lumps, and properties of the gypsum raw material. Optionally, the surface of gypsum raw material lumps is blown during the heating stage. Optionally, the heating medium humidity is changed. Optionally, a surface of the gypsum raw material lumps is pre-moistened.

Optionally, the method further includes over-pressurizing at the heating stage and/or under-pressurizing at the drying and cooling stages. Optionally, in preliminary mechanical or chemical action on the surface of gypsum raw material lumps. Optionally, indirectly heated air or direct flue gases are used as a heating medium. Optionally, the method further includes milling wherein fractions of the lumps near-surface layer and central part, rich in gypsum α-modification, are separated. Optionally, the method further includes introducing additives, affecting the recrystallization process, into the composition and/or on the surface of agglomerated and/or lumpy raw material.

Optionally, the method further includes covering the surface of lumpy or agglomerated raw material with a coating that changes properties of surface pores. Optionally, the method further includes, during processing, exposing raw material to SHF radiation in order to change recrystallization parameters. Optionally, the method further includes obtaining a dehydrated gypsum α-hemihydrate or a soluble α-anhydrite with their subsequent reduction to gypsum α-hemihydrate.

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to the preferred embodiments of the present invention, examples of which are discussed below.

The technical result of the present invention is obtaining α-modification of gypsum and multi-phase gypsum binders based on using lumpy raw material, at atmospheric pressure in a gaseous medium.

The technical result is achieved due to the fact that, in the proposed method involving dehydration of gypsum raw material lumps by heating at atmospheric pressure, heating of gypsum raw material lumps is carried out by placing them in thermal shock conditions and for a period required for completion of the dehydration reaction with predominating formation of α-modification of calcium sulfate hemihydrate, with further drying, cooling, and milling. Thermal shock conditions, or fast external heating by placing the lumps in a high-temperature environment and/or by ensuring high growth rate of ambient temperature around the lumps, the favour growth of water vapor pressure within a lump, which is necessary for dehydration with formation of, mainly, gypsum α-hemihydrate.

Thermal shock is understood as characterized either by treating at high temperatures or high speed of temperature increase, or fast increase of temperature to the values above normally used values.

The thermal shock suggests that the amount of energy, applied to raw material, is greater than energy required for transformation processes in used raw materials at every instant, i.e., energy is supplied in excess of its consumption.

When heated using the thermal shock method, the conditions for dehydration with developing α-modification of gypsum are established within a lump, i.e., each lump becomes mini-autoclave for itself and conditions for dehydration with formation of gypsum α-modification are created within every gypsum lump. Such conditions are not established in the near-surface layer of a lump, and β-modification of gypsum develops there.

Each particular raw material has its own thermal shock conditions. Thus, in our case, the thermal shock must be understood as such conditions of heat treatment of raw material lumps at the atmospheric pressure, under which the dehydration process occurs with α-recrystallization.

Thermal shock parameters and time of the process are determined in advance, depending on properties of a specific raw material, size of lumps, and requirements to the end product as to the ratios α- and β-hemihydrates or other gypsum modifications in the end product.

Dividing the process into heating, drying and cooling stages is known. The heating stage implies dehydration and recrystallization, the drying stage—product dewatering, cooling—product cooldown. At the same time, it's difficult to draw distinct boundaries between the stages. So, during the heating stage, moisture evaporates through lump surface and drying of processed raw material occurs. During lump drying and water evaporation, processed raw material cools down.

This method is flexible and allows many modifications of operation sequence:
 heating, drying, cooling, crushing;
 heating and drying in one device, cooling, crushing;
 heating and drying in one device, crushing, cooling;
 heating, crushing, drying, cooling;
 heating, crushing and drying in one device, cooling;
 and other similar options.

The temperature of the gaseous media for thermal shock, drying, and cooling is selected from a technically feasible range, so that this technological stage can be carried out. The process conditions—temperature and time—can vary within a wide range.

The temperature of thermal shock medium is selected from the range 140° C. to 1200° C. The process of dehydration with α-recrystallization must progress within a lump at a specific temperature during a specific time period. The drying temperature can range from the ambient temperature to the thermal shock temperature. What matters is that, at this temperature and during this time period, a dehydrated product should lose moisture and no rehydration process should occur.

The process time can vary from 15 minutes to 5 hours.

This method can be used for processing raw material with naturally determined temperature and does not require pre-heating or cooling of the raw material.

Gypsum raw material lumps can be formed by both crushing natural gypsum rock and by agglomerating powders and/or fine fractions of natural, synthetic, or recycled gypsum.

Lumpy raw materials of sizes customary for the gypsum industry are processed; meanwhile, other process conditions, leading towards the needed result, are adjusted to specific raw material parameters.

The production can be both continuous and periodic.

The thermal shock and drying stages can be combined.

The drying and/or cooling, and/or milling stages can be combined simultaneously and/or in one device.

Blowing of raw materials during dehydration process increases the content of gypsum β-modification in the near-surface layer of the lumpy gypsum.

Using smaller raw material fractions accelerates the dehydration process but, doing so leads to increasing content of calcium sulfate hemihydrate β-modification in the end product.

Milling using the surface abrasion method allows separating the product from the near-surface layer with an increased content of gypsum β-modification and the product from the middle of a lump with predominating content of gypsum α-modification.

Increasing humidity of the thermal shock medium accelerates the rate of material heating.

Decreasing humidity of the medium at the drying and/or cooling stages accelerates these processing stages.

Wetting of lump surface accelerates the thermal shock stage of the process.

When special additives that influence gypsum recrystallization are added to water which is used for wetting of lump surface and/or introduced into the agglomerated raw material, it affects the composition, structure and characteristics of the end product.

Over-pressurizing at the thermal shock stage and/or under-pressurizing at the drying and cooling stages contribute to the production process but they are not mandatory.

Preliminary surface treatment of gypsum raw material lumps to modify the pore structure, e.g., extra coating, will change the process modes and properties of the resulting product.

It is possible to carry out the process under non-isothermal conditions: e.g., increasing temperature in a set range at a certain rate during the thermal shock stage and decreasing it during the subsequent stages or vice versa. It is also possible to introduce temperature oscillating processes in order to affect functional properties of the resulting product.

Both indirectly heated air and direct flue gases can be used for the process.

Additional exposure to SHF radiation at the moment of recrystallization will change properties of the end product.

The suggested method can also be used for production of dehydrated α-hemihydrate of gypsum or soluble α-anhydrite with their subsequent reduction to α-hemihydrate of gypsum. Insoluble anhydrite can also be produced. The process parameters can be chosen so that the finished product contains the active lime.

Application of this method is possible when producing finished products directly from gypsum. For this purpose, a pre-molded product is placed in the medium and conditions of thermal shock, under which formation of gypsum α-modification occurs within the product followed by further cooling and drying completion stages.

Varying the process parameters allows obtaining gypsum binders with diverse compositions and changing the ratio of α- and β-modifications, hemihydrate, and anhydrite in a wide concentration range directly within the production process.

The method was implemented in the examples as follows.

As a source raw material, samples of natural gypsum lumps, agglomerated in lumps and dried calcium sulfate dihydrate powder were used. The size of the lumps was 3-6 cm.

The treatment process using the thermal shock method was carried out at atmospheric pressure by placing the gypsum raw material in a medium with the hot air under isothermal conditions at temperatures ranging from 160° C. to 360° C. The baking time was varying from 45 minutes to 3.5 hours.

Table 1 summarizes the data of the Rietveld method for quantitative X-ray phase analysis and assessment results of calcium sulfate hemihydrate α-modification for several samples obtained by combining the thermal shock and drying processes. The treated samples represent hemihydrate gypsum with a certain content of impurities inherent with the source raw material; and presence of small amounts of anhydrite and calcium sulfate dihydrate was observed in some cases.

It was found that diffraction lines of the calcium sulfate hemihydrate were not broadened, what is evidence of low crystallite microstress values typical of α-gypsum. No amorphous phase was found in the samples.

TABLE 1

| Type of sample for treatment | Temperature of heating medium, ° C. | Treatment period, min | $CaSO_4 \times 2H_2O$, % wt | $CaSO_4(II)$, % wt | $CaSO_4(III)$, % wt | $\alpha\text{-}CaSO_4 \times 0.5H_2O / \beta\text{-}CaSO_4 \times 0.5H_2O$ |
|---|---|---|---|---|---|---|
| Lumpy natural gypsum | 180 | 220 | 0.5 | 0.8 | 0.0 | 95/5 |
| | 210 | 140 | 0.0 | 2.2 | 0.0 | 60/40 |
| | 250 | 80 | 0.0 | 2.1 | 0.0 | 75/25 |

TABLE 1-continued

| Type of sample for treatment | Temperature of heating medium, °C. | Treatment period, min | CaSO$_4$ × 2H$_2$O, % wt | CaSO$_4$(II), % wt | CaSO$_4$(III), % wt | α-CaSO$_4$ × 0.5H$_2$O/ β-CaSO$_4$ × 0.5H$_2$O |
|---|---|---|---|---|---|---|
| stone | 250[1] | 80 | 0.0 | 0.0 | 0.0 | 80/20 |
|  | 360[2] | 90 | 0.0 | 68.8 | 23.1 | — |
|  | 360 | 45 | 0.0 | 2.5 | 0.0 | 75/25 |
| Agglomerate of natural gypsum powder | 210 | 85 | 0.0 | 1.2 | 0.0 | 70/30 |

[1]Study was performed for the fraction obtained from the central part of a gypsum lump.
[2]Anhydrite sample was made.

It is evident that the content of gypsum α-modification for the fraction, taken from the middle of the sample lump, is slightly higher against the volume-averaged fraction.

Heating the sample with a medium temperature 360° C. resulted in formation of anhydrite. Whereas, the sample processing under the same conditions, but with earlier stopping of the process, resulted in a product with a sufficiently high concentration of α-gypsum 75% and the soluble anhydrite content 2.5% during the baking period of 45 minutes.

Thus, the technical result of the invention is achieved. The obtained end product samples represent hemihydrate gypsum with the ratio of α-modification to β-modification up to 95%.

An essential advantage of this invention is its environmental benefit.

First, applying the new technology results in a significant reduction of energy consumption in contrast to other methods of α-gypsum production, which will allow both reducing material costs and lowering the environmental impact of harmful technological factors associated with energy generation.

Second, the suggested method is easily applicable for processing of gypsum raw material, being a by-product of many industries implemented, largely, to reduce sulfur emissions.

Third, the recommended method does not require the stage of washing using lots of clean water, as needed for the solution technology of obtaining α-gypsum in the presence of an electrolyte.

Fourth, using such a simple and inexpensive technology for producing extra strong gypsum will allow expanding its application and displacing cement-based binders that, both in terms of their properties and production conditions, show inferior environmental characteristics.

Fifth, it is important that application of gypsum in construction allows its multiple recycling, which makes it different from currently popular concretes and cements that can be used one time only.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method of producing a gypsum binder, the method comprising:
   dehydrating of gypsum raw material lumps by heating in a gaseous medium with further drying, cooling, and milling stages,
   wherein the heating gypsum raw material lumps is performed either by:
   (i) placing the lumps in a heating medium set to a temperature exceeding the temperature under which dehydration and formation of gypsum α-hemihydrate occurs; or
   (ii) placing the lumps in a heating medium having a rate of temperature increase such that a temperature higher than the temperature under which dehydration and formation of gypsum α-hemihydrate occurs is reached;
   wherein a heating time is selected sufficient for completion of gypsum α-modification formation within the gypsum lumps, and
   wherein the heating is performed under atmospheric pressure through lump surface.

2. The method of claim 1, wherein natural gypsum stone and/or synthetic gypsum, and/or recycled gypsum are used as gypsum raw materials.

3. The method of claim 2, wherein the lumps of gypsum raw material are formed by crushing and/or agglomerating.

4. The method of claim 1, wherein the heating medium temperature and heating time are determined experimentally for a particular raw material, depending on a size of lumps, properties of gypsum raw material and pore structure.

5. The method of claim 1, wherein the heating medium temperature is at least 140° C.

6. The method of claim 1, wherein the temperature of the medium for the drying stage is between an ambient temperature and a thermal shock temperature.

7. The method of claim 6, wherein the thermal shock temperature is 140° C. to 1200° C.

8. The method of claim 1, wherein the heating and drying stages are combined.

9. The method of claim 1, wherein the drying and/or cooling and/or milling stages are combined.

10. The method of claim 1, wherein the heating time is from 20 minutes to 5 hours.

11. The method of claim 1, wherein a heating medium humidity is varied.

12. The method of claim 1, wherein a surface of the gypsum raw material lumps is pre-moistened.

13. The method of claim 1, further comprising over-pressurizing at the heating stage and under-pressurizing at the drying and cooling stages.

14. The method of claim 1, wherein indirectly heated air or direct flue gases are used as a heating medium.

15. The method of claim 1, further comprising milling such that a near-surface layer of the lumps is separated from central part of the lumps rich in gypsum α-modification.

16. The method of claim 1, further comprising introducing additives, affecting a recrystallization process on a surface of the raw material.

17. The method of claim 1, further comprising exposing raw material to electromagnetic radiation in order to change recrystallization parameters.

18. The method of claim 1, further comprising obtaining a dehydrated gypsum α-hemihydrate or a soluble α-anhydrite with their subsequent reduction to gypsum α-hemihydrate.

19. The method of claim 1, wherein process parameters are chosen so that the gypsum binder contains active lime.

20. The method of claim 1, wherein the temperature of the medium for the drying stage is 100 to 400° C.

* * * * *